US012527530B2

(12) United States Patent
Ying

(10) Patent No.: US 12,527,530 B2
(45) Date of Patent: Jan. 20, 2026

(54) CEILING MOUNTED X-RAY COMPUTED TOMOGRAPHY SYSTEMS

(71) Applicant: Zhengrong Ying, Belmont, MA (US)

(72) Inventor: Zhengrong Ying, Belmont, MA (US)

( * ) Notice: Subject to any disclaimer, the term of this patent is extended or adjusted under 35 U.S.C. 154(b) by 0 days.

(21) Appl. No.: 18/375,550

(22) Filed: Oct. 1, 2023

(65) Prior Publication Data

US 2025/0107865 A1 Apr. 3, 2025

(51) Int. Cl.
*A61B 6/03* (2006.01)
*A61B 90/00* (2016.01)

(52) U.S. Cl.
CPC .............. *A61B 6/035* (2013.01); *A61B 90/37* (2016.02); *A61B 2090/3762* (2016.02)

(58) Field of Classification Search
CPC . A61B 34/20; A61B 90/37; A61B 2034/2065; A61B 2090/3762; A61B 6/502; A61B 6/035; A61B 6/4435; A61B 6/4405; A61B 6/107; A61B 6/5211; A61B 6/56; A61B 6/032; A61B 6/4007; A61B 6/4014; A61B 6/4028; A61B 6/587; A61B 6/54; A61B 6/542; A61B 6/40; A61B 6/03; A61B 6/0435; A61B 6/4233; A61B 6/4291; A61B 6/06; A61B 6/4447; A61B 6/545; A61B 6/4208; A61B 6/12; A61B 6/4452; A61B 6/4085; A61B 6/0414; A61B 6/025; A61B 6/42; A61B 6/508; A61B 6/504; A61B 6/027; A61B 6/04; A61B 6/462; A61B 6/0464; A61B 6/4078; A61B 6/4476; A61B 6/465; A61B 6/0487; A61B 6/582; A61B 6/102; A61B 6/105; A61B 6/0407; A61B 6/547; A61B 6/08; A61B 6/501; A61B 6/461; A61B 6/466; A61B 6/4464; A61B 6/50; A61B 6/583; A61B 6/4482; A61B 5/0077; A61B 90/25; A61B 6/463; A61B 2090/3764; A61B 2090/372; A61B 2034/2048; A61B 2090/366; A61B 90/35; A61B 2090/3966; A61B 2034/2051; A61B 2090/376; A61B 6/482; A61B 6/4266; A61B 8/4218; A61B 90/13; A61B 34/30;

(Continued)

(56) References Cited

U.S. PATENT DOCUMENTS 6,203,196 B1 * 3/2001 Meyer .................. A61B 6/4441
378/197
2010/0172468 A1 * 7/2010 Gregerson ........... A61B 6/0407
378/208

(Continued)

*Primary Examiner* — Irakli Kiknadze

(57) ABSTRACT

A ceiling mounted X-ray Computed Tomography (CT) system, in particular, for use in multiple surgical operating rooms is disclosed; wherein the X-ray CT system comprises a ceiling mounted rail, a hanging support, and a ring structure; wherein the hanging support is connected with the ring structure via two sagittal driving bearings; wherein the ring structure comprises a stator and a rotor; wherein an X-ray source and an X-ray detector subsystem are mounted on the rotor; wherein the X-ray source and the X-ray detector subsystem are rotated within the axial plane while being moved along the ceiling rail for acquiring the digital data representing the X-ray attenuation coefficients of a patient under surgical operation, resulting in real-time 3D CT images of the patient to be fed into a surgical robot to perform automated surgeries.

18 Claims, 5 Drawing Sheets

(58) Field of Classification Search
CPC ............... A61B 5/0062; A61B 6/4417; A61B
2034/2055; H01J 35/065; H01J 35/13;
H01J 2235/068; H05G 1/08; H05G 1/22;
H05G 1/265; H05G 1/34; H05G 1/32;
H05G 1/46; H05G 1/56; H05G 1/30;
H05G 1/04; H05G 1/26; H05G 1/12;
H05G 1/54; H05G 1/10; G01N 23/046;
G01N 2223/304; G01N 2223/419; G06T
11/003; G06T 2207/10072; G06T
2207/10116; G01T 1/1644; G01T 1/202;
G01T 1/1612; G01T 1/2018; G01T
1/20181; A61N 5/1049; A61N 5/1084;
A61N 2005/1061; A61N 2005/1074
USPC ........................ 378/4, 17, 19, 62, 196, 198
See application file for complete search history.

(56) References Cited

U.S. PATENT DOCUMENTS

| | | | | |
|---|---|---|---|---|
| 2011/0280379 A1* | 11/2011 | Maschke | ............... | A61B 6/4458 901/15 |
| 2011/0280380 A1* | 11/2011 | Maschke | ............... | A61B 6/4411 378/197 |
| 2014/0046212 A1* | 2/2014 | Deutschmann | ...... | A61B 6/0407 378/20 |
| 2018/0353143 A1* | 12/2018 | Gregerson | ........... | A61B 6/4447 |
| 2020/0121267 A1* | 4/2020 | Deutschmann | ...... | A61B 6/4452 |
| 2025/0170426 A1* | 5/2025 | Zhang | ................. | A61N 5/1049 |

* cited by examiner

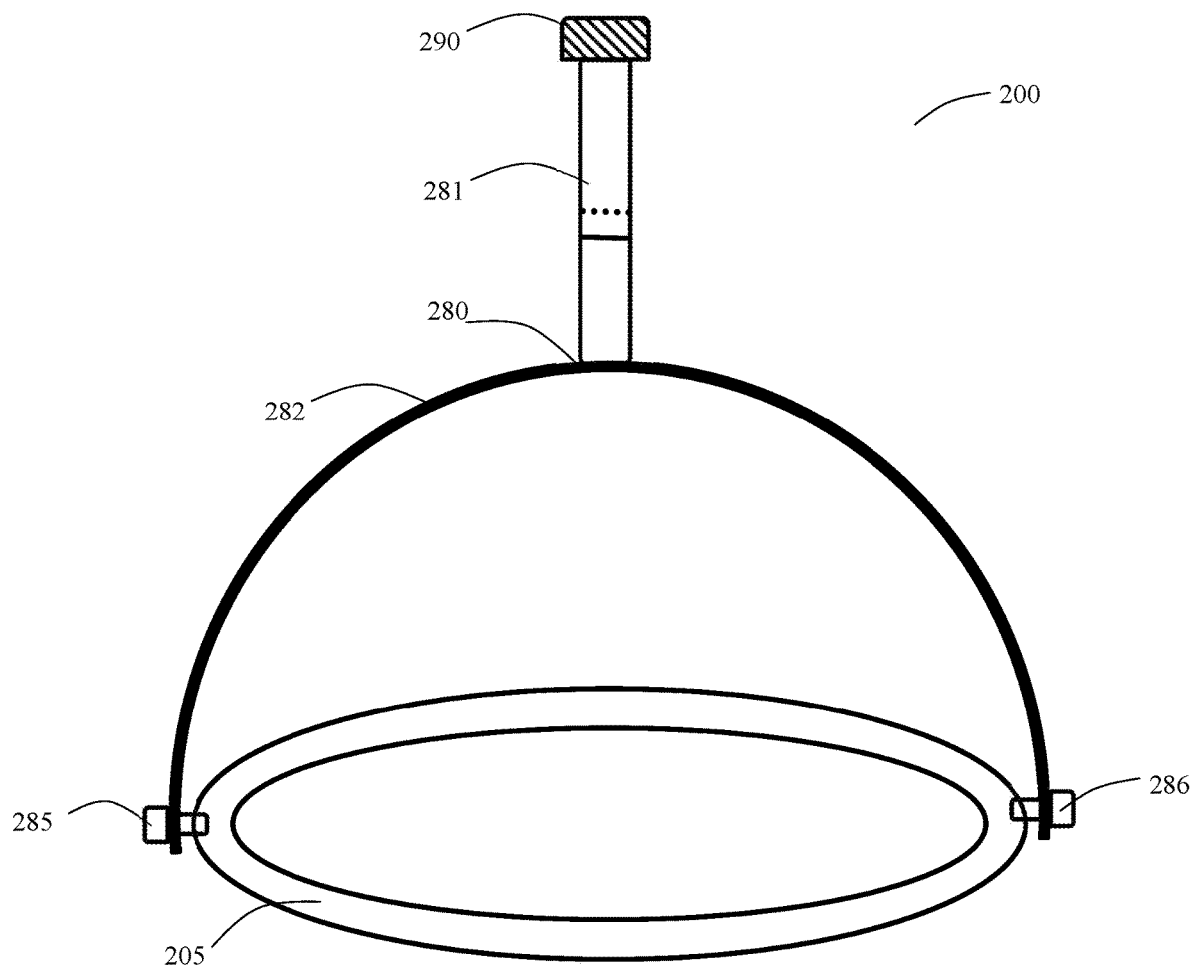
FIG. 2C
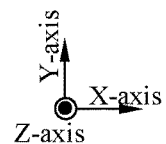

CEILING MOUNTED X-RAY COMPUTED TOMOGRAPHY SYSTEMS

FIELD OF THE DISCLOSURE

The present disclosure relates to X-ray Computed Tomography (CT) systems.

BACKGROUND

In X-ray CT systems, X-rays are used to image internal structures and features of a region of a subject or an object. The terms "subject" and "object" shall include anything capable of being imaged. The imaging is performed by an X-ray CT system, which images internal structures and features of a plurality of thin planar slices or a 3D volume of a region of an object using X-rays. For medical applications, the imaging objects include human bodies, or patients.

An X-ray CT system generally comprises an X-ray source that provides a cone-shaped X-ray beam and an array of closely spaced X-ray detectors that face the X-ray source. The X-ray source and the array of detectors are mounted in a gantry so that an object being imaged with the CT system, generally lying on an appropriate support couch, can be positioned within the gantry between the X-ray source and the array of detectors. The couch is moved with respect to the gantry so that the X-ray source and the detector array can be positioned axially at desired locations along a human's body.

The gantry comprises a stationary structure referred to as a stator and a rotary element referred to as a rotor, which is mounted to the stator so that the rotor is rotatable within the axial plane. In third generation CT systems, the X-ray source and the array of detectors are mounted on the rotor.

To image a slice in a region of a human's body, the X-ray source is positioned at an axial position of the slice and the X-ray source is rotated around the slice to illuminate the slice with X-rays from a plurality of different view angles. At each view angle, detectors in the array of detectors generate signals responsive to the intensity of X-rays from the source that pass through the slice. The signals are processed to determine the amounts, by which X-rays from the X-ray source are attenuated over various path lengths through the slice that the X-rays traverse, in passing though the slice from the X-ray source to the detectors. The amounts, by which the X-rays are attenuated, are used to determine the X-ray absorption coefficients of materials in the slice as a function of position in the slice. The absorption coefficients are used to generate an image of the slice and identify compositions and densities of tissues in the slice.

The gantry of a CT system is placed and typically fixed on ground or floor, and the total weight of the gantry is typically over 1000 kilograms, and sometimes even 2000 kilograms. Due to its heavy weight and fixed installation, the applications of CT systems in surgical operating rooms are very limited if not impossible.

SUMMARY OF THE DISCLOSURE

In accordance with one embodiment of the present disclosure, a ceiling mounted X-ray Computed Tomography (CT) system, in particular, for use in multiple surgical operating rooms is disclosed; wherein the X-ray CT system comprises a ceiling mounted rail, a hanging support, and a ring structure; wherein the hanging support is connected with the ring structure via two sagittal driving bearings; wherein the ring structure comprises a stator and a rotor; wherein an X-ray source and an X-ray detector subsystem are mounted on the rotor; wherein the X-ray source and the X-ray detector subsystem are rotated within the axial plane while being moved along the ceiling rail for acquiring the digital data representing the X-ray attenuation coefficients of a patient under surgical operation, resulting in real-time 3D CT images of the patient to be fed into surgical robots to perform surgeries.

In accordance with one embodiment of the present disclosure, a battery unit is mounted on the rotor, providing power to the rotor. The battery unit is charged through a releasable connection between the rotor and the stator while the rotor is not rotating, resulting in the removal of traditional usage of a slip ring for power transfer.

In accordance with one embodiment of the present disclosure, an image reconstructor is also mounted on the rotor, allowing the direct data connection between the detector subsystem and the image reconstructor, resulting in removal of traditional usage of a slip ring for data transfer.

In accordance with one embodiment of the present disclosure, the yaw driving mechanism in the ceiling mounted rail provides the another degree of movement, rotating about the Y axis. This degree of freedom allows the CT system to avoid spatial collision with other equipment in the surgical room. Another degree of the movement of the system is by the hanging support, which is capable of retracting and extending the ring structure. This provides the ability of the X-ray CT system to fit to different heights and different configurations of the surgical operating table.

BRIEF DESCRIPTION OF THE DRAWINGS

The drawing figures depict embodiments by way of example, not by way of limitation. In the figures, like reference numerals refer to the same or similar elements.

FIG. 2C shows a schematic functional diagram of a ceiling mounted X-ray CT system when in a tilted position in accordance with one embodiment of the present disclosure.

DETAILED DESCRIPTION OF THE DRAWINGS

Figure 1:
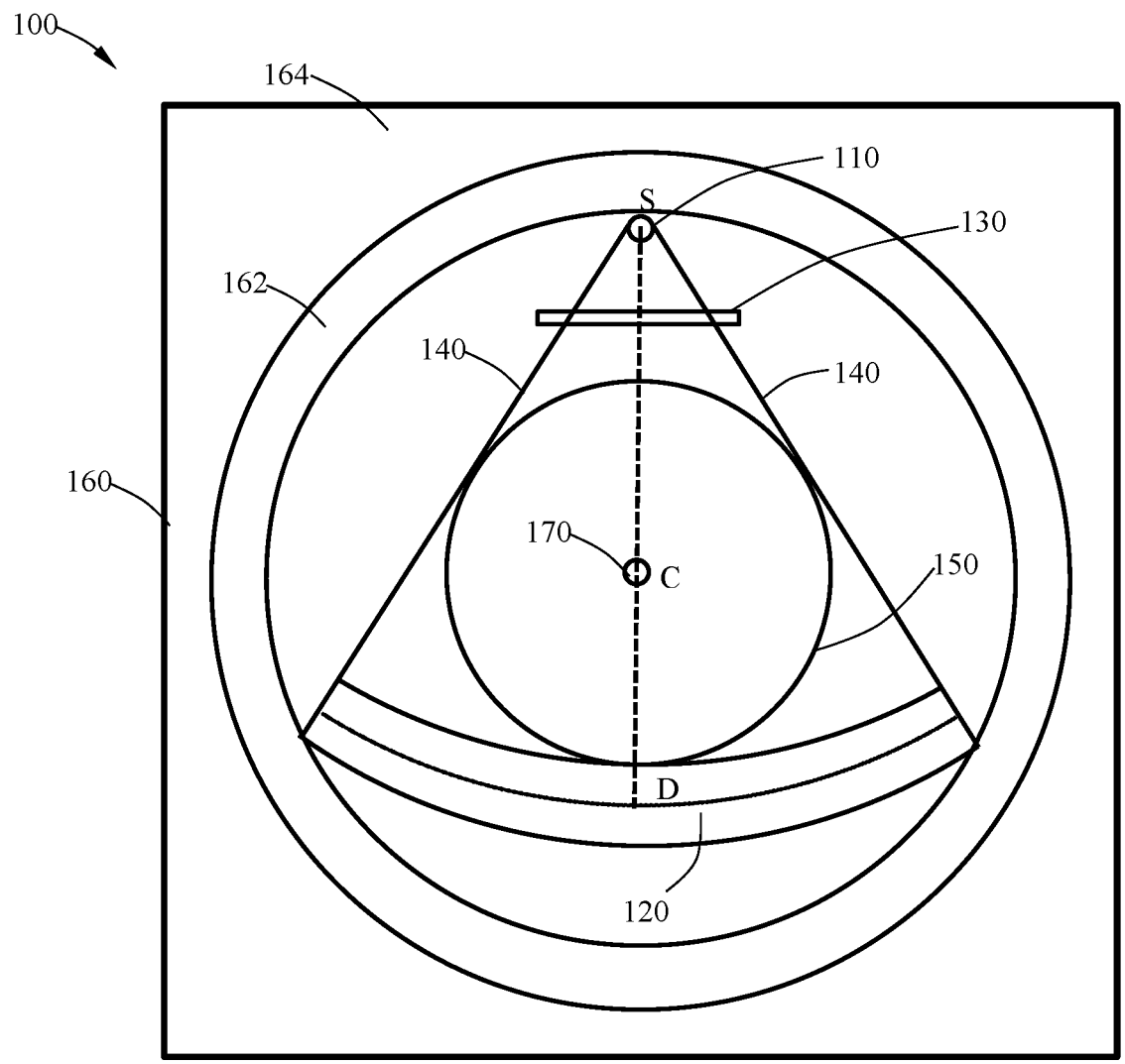
FIG. 1 shows a schematic functional diagram of a prior art X-ray CT system.
Figure 1:
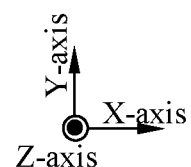

FIG. 1 shows a schematic functional diagram of a prior art X-ray CT system 100. An X-ray CT system typically comprises an X-ray source 110, which generates a cone-shaped X-ray beam 140. The X-ray beam 140 passes through a pre-patient collimator 130, which allows X-ray beam to illuminate only the targeted area and blocks X-ray beam in unwanted area. A patient usually lies down within the scanner's scanning Field Of View (FOV) 150, where the X-ray beam 140 illuminates. The X-ray detector system 120 receives X-ray photons and converts to analog signals that are proportional to X-ray photon energies. The X-ray CT system 100 also comprises a gantry 160, which includes a rotational part 162 and a stationary part 164. The X-ray source 110, the collimator 130 and the detector system 120 are mounted on the rotational part 162 of the gantry 160. The rotational part 162 rotates around the rotation center C 170. The stationary part 164 is placed and typically fixed on ground or floor to support the weight of such an X-ray CT system, which is typically over 1000 kilograms, and sometimes even 2000 kilograms.

The focal spot S, which sometimes is interchangeably referred to as X-ray source position, of the X-ray source 110. The rotation center C, which is interchangeably called iso-center. The direction from the iso-center to the focal spot of the X-ray source is hereinafter referred to as Y-axis, and the direction perpendicular to the imaging plane or the rotation plane is hereinafter referred to as Z-axis, and the direction perpendicular to the Y-axis within the rotation plane is hereinafter referred to as X-axis. The X-Y plane is also referred as axial plane, and the Y-Z plane is also referred as sagittal plane.

Figure 2A:
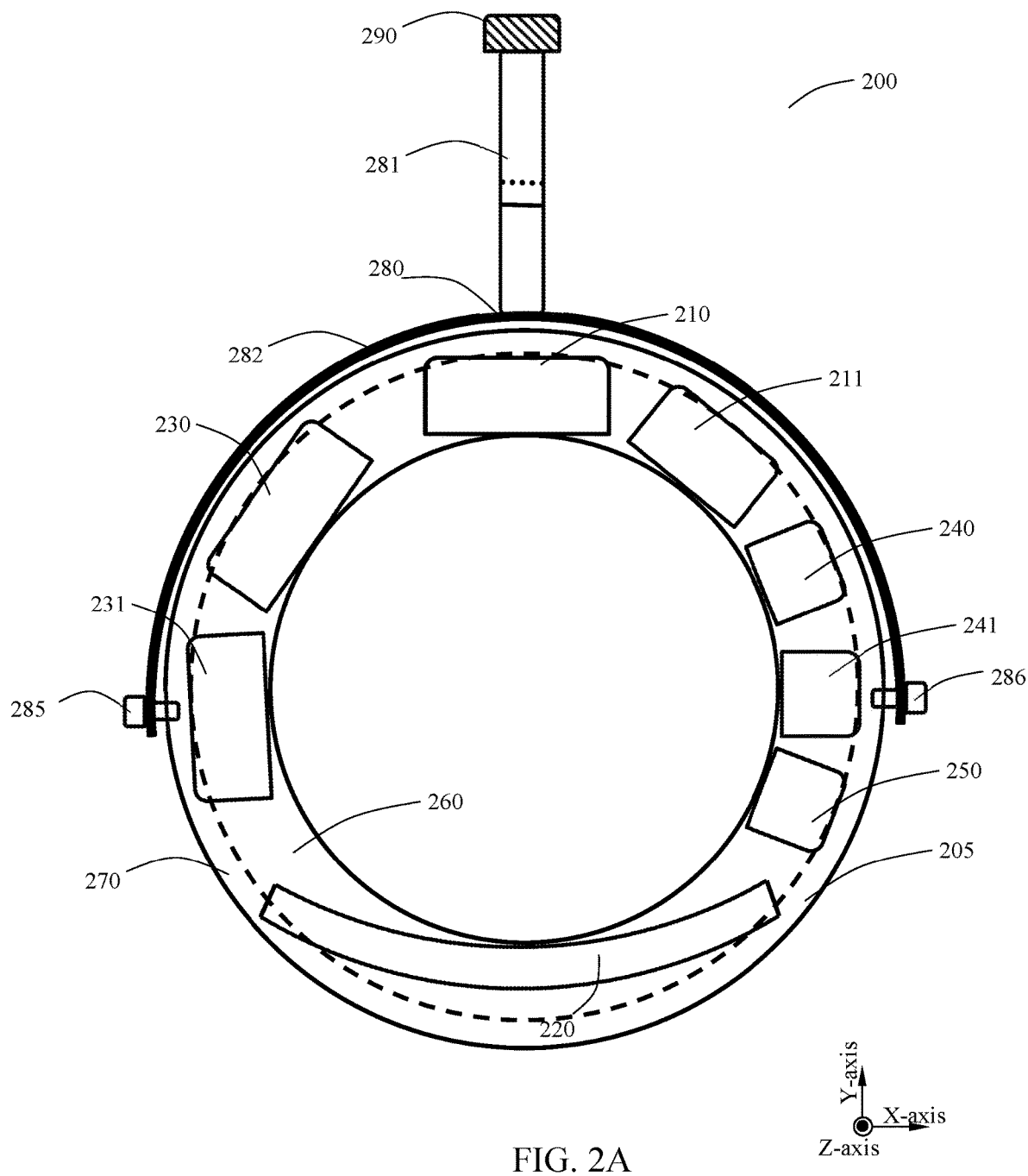
FIG. 2A shows a schematic functional diagram of a front view of a ceiling mounted X-ray CT system in accordance with one embodiment of the present disclosure.

FIG. 2A shows a schematic functional diagram of a front view of a ceiling mounted X-ray CT system 200 in accordance with one embodiment of the present disclosure, wherein the front view is defined as viewing from positive Z axis direction.

In one embodiment of the present disclosure, a ceiling mounted X-ray CT system 200 comprises a ring structure 205, a hanging support 280, and a ceiling mounted rail 290. The ceiling mounted rail 290 is connected with the hanging support 280 using a sliding carriage (not shown). The sliding carriage is movable along the rail and holds up the attached load from the hanging support. The hanging support 280 comprises a linear motion lifter 281 and an arc-shaped support 282, wherein the linear motion lifter 281 extends and retracts the arc-shaped support 282 along the Y axis or vertically. This degree of moving freedom provides the ability of the X-ray CT system to fit different heights and different configurations of a surgical operating table when deployed in surgical operating rooms.

In another embodiment of the present disclosure, the ring structure 205 comprises a rotor 260 and a stator 270. An X-ray source 210 and an X-ray detector subsystem 220 are mounted on the rotor 260 with 180 degrees apart facing each other. The x-ray beam generated by the X-ray source 210 pass through the objects to be imaged. The X-ray intensity is attenuated by the objects and the remaining photons of the X-ray are received by the X-ray detector subsystem to generate digital data representing the X-ray attenuation coefficients of the objects.

In accordance with one embodiment of the present disclosure, the X-ray source 210 does not contain a high voltage generation unit, thus a separate high voltage generator is mounted on the rotor 260. In order to make the width (along Z) and the thickness (radial direction) of the ring structure 205 as small as possible, The high voltage generator may comprise more than one modules, for example module 230 and module 231 as shown in FIG. 2A. In an alternative embodiment, the X-ray source 210 is integrated with a high voltage generation unit together, thus no separate high voltage generator is needed. In another alternative embodiment, a separate heat exchange 211 is mounted on the rotor 260 to dissipate the heat generated from the X-ray source 210.

Still referring to FIG. 2A, in one exemplary embodiment of the present disclosure, at least one battery unit(s) 240 (and 241) is (are) mounted on the rotor 260, providing the electric power to the rotor 260. The battery units are charged from electric connections (not shown) from the stator 270. The electric connections between the stator 270 and the rotor 260 are only established while the rotor 260 is not rotating, and are separated while the rotor 260 is rotating; such a configuration removes the traditional usage of a slip ring containing carbon brushes for transferring the power from a stator to a rotor in conventional X-ray CT systems. In one aspect of the embodiment, the charging power from the stator is a single phase power instead of a three phase power like in a traditional X-ray CT system, which is the sole electric power to the X-ray CT system 200. In another aspect of the embodiment, the high voltage generator takes the direct current (DC) power from the battery units as the input power to generate the high voltage needed for the X-ray source 210.

Yet in another embodiment of the present disclosure, an image reconstructor 250 is also mounted on the rotor 260. The image reconstructor 250 takes the acquired digital data from the X-ray detector subsystem 220 as inputs and generates the images of the objects to be imaged. The data connection between the image reconstructor 250 and the X-ray detector subsystem 220 is, for example, by fiber optics, at data transfer rate, for example, 2.5 Gbps; such a configuration also removes the traditional usage of a slip ring containing capacitive data link for transferring the data from a rotor to a stator in conventional CT systems.

Figure 2B:
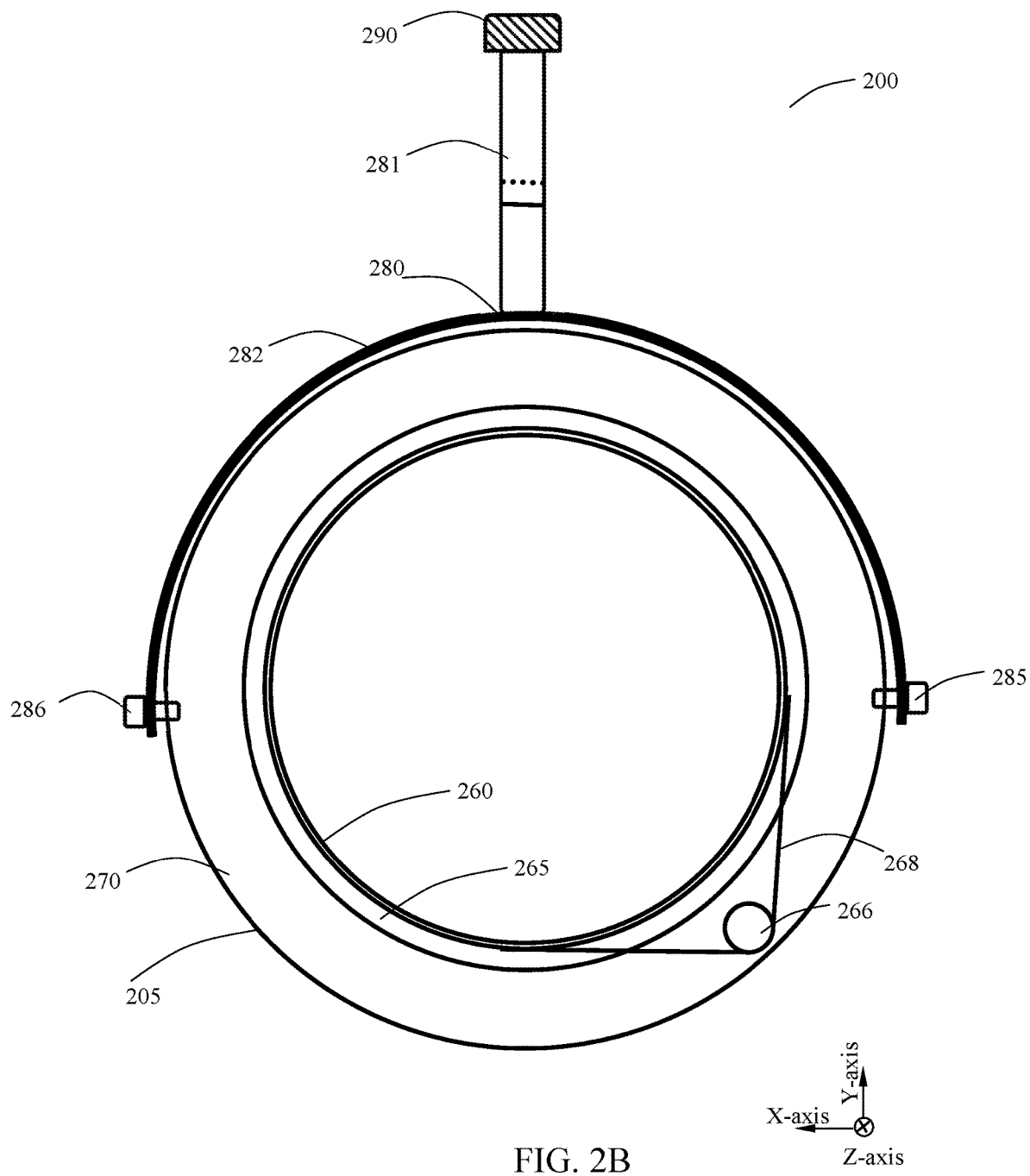
FIG. 2B shows a schematic functional diagram of a back view of a ceiling mounted X-ray CT system in accordance with one embodiment of the present disclosure.

FIG. 2B shows a schematic functional diagram of a back view of a ceiling mounted X-ray CT system in accordance with one embodiment of the present disclosure. the rotor 260 and the stator 270 are connected with an axial bearing 265, so as to allow the rotor 260 to rotate within the axial plane. The driving mechanism for the rotor 260 to rotate may be implemented, for example, a motor 266 and a belt 268, or by direct driving means.

The arc-shaped support 282 is connected with the ring structure 205 via two sagittal driving bearings 285 and 286 in opposite direction with respect to each other. These two sagittal driving bearings integrated with torque motors, speed reducers, angular encoders, and brakes hold up the ring structure 205; wherein the torque motors provide a driving mechanism for tilting the ring structure 205 within the sagittal plane, wherein the speed reducers and brakes allow the ring structure 205 to be tilted and locked at a desirable angular position as shown in an exemplary embodiment in FIG. 2C while the CT system is scanning and imaging objects.

Figure 2D:
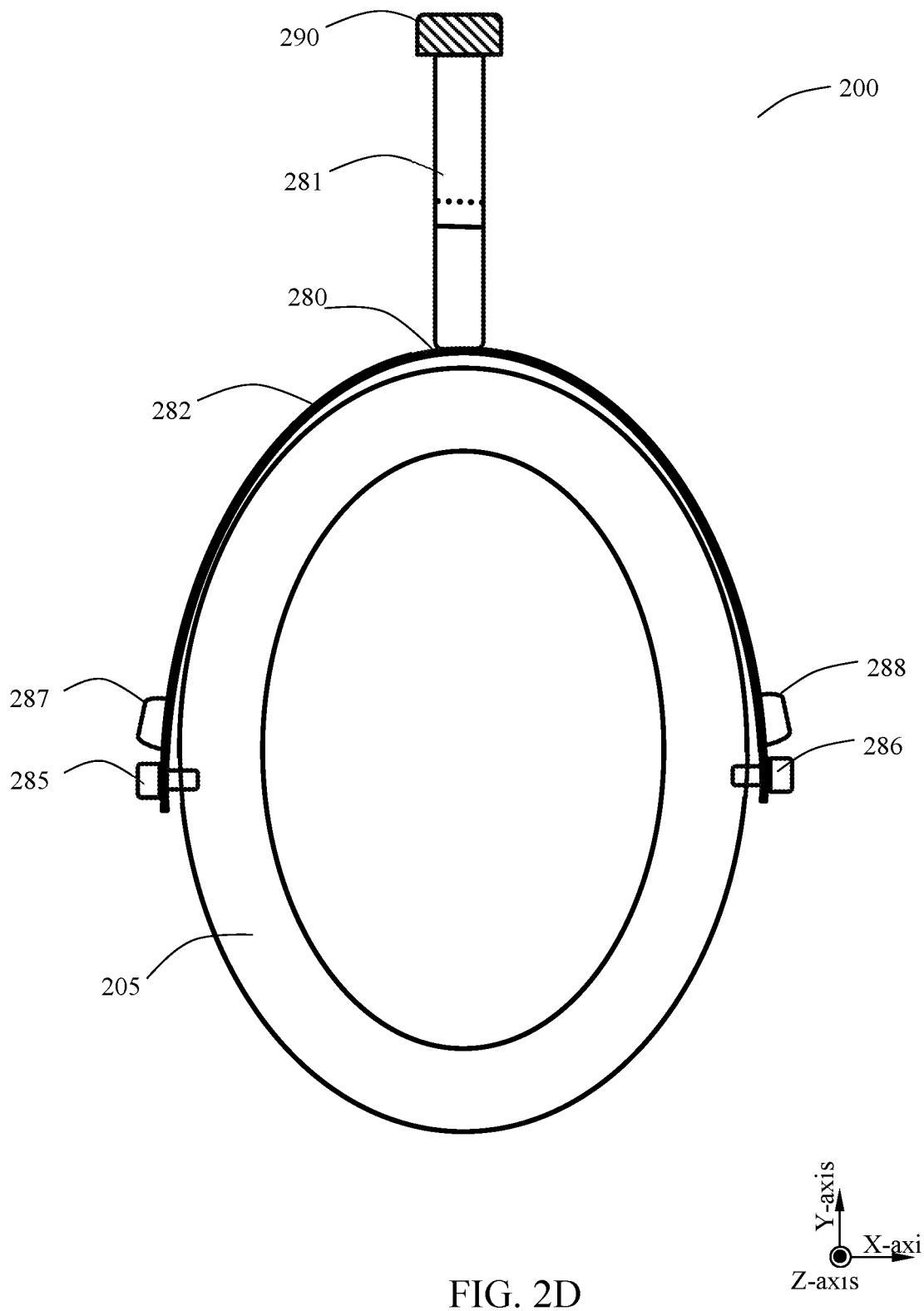
FIG. 2D shows a schematic functional diagram of a ceiling mounted X-ray CT system when in a yawed position in accordance with one embodiment of the present disclosure.

FIG. 2D shows a schematic functional diagram of a ceiling mounted X-ray CT system when in a yawed position in accordance with one embodiment of the present disclosure. In the ceiling mounted rail 290, there are two driving mechanisms implemented to yaw the hang support 280 about the Y axis and to move the hang support 280 along the Z axis respectively. The degree of yaw movement allows the CT system to avoid in spatial collision with other equipment in a surgical room setting.

In one embodiment of the present disclosure, the ceiling mounted rail is installed in the ceiling of a surgical operating room. In a surgical operating room, there is typically a surgical operating table, on which a patient is placed for surgical operations. Before, during, and after a surgical operation, it is desirable to have 3D CT images of a patient at operating positions and postures, such that the 3D CT images of the patient being operated can be used for precise and real-time surgical planning, in-surgery monitoring and surgical operation quality assurance and exceptional emergency process. The ceiling mounted X-ray CT system 200 also provides image data interface to surgical robots, enabling more automated surgical operations.

In another embodiment of the present disclosure, the ceiling mounted X-ray CT system 200 performs CT scans by linearly moving the ring structure 205 along the Z axis, to have X-ray beam pass through the patient on the surgical operating table to acquire digital data, then generate CT images of the patient being imaged.

In accordance with one embodiment of the present disclosure, the ceiling mounted rail is installed across multiple surgical operating rooms, so that hanging support together with the ring structure can be moved from one operating room to another operating room to maximally utilize the X-ray CT system. The movement of from one operating room to another maybe conducted manually, meaning that a person pulls or pushes a handle 287 or 288 on the hanging support from one operating room to another. In another aspect of the embodiment, electrically powered motor on the ceiling mounted rail moves the hanging support and is controlled and operated by a person.

Yet in another embodiment of the present disclosure, due to the ceiling mounting design, it is preferable to have the weight of the hanging support and the ring structure altogether as light as possible, for example, no more than 500 kilograms. Also due to the use case as in surgical operating rooms, the width and the thickness of the ring structure are also preferable to as small as possible, for example, no more than 40 cm for each. In order to accommodate different surgical operating procedures with different postures and positions of patients in operation, it is also preferable to have the opening of the ring structure for patient in and out of the X-ray CT system to be as large as possible, for example, no smaller than 110 cm in diameter.

While this disclosure has been particularly shown and described with references to the embodiments thereof, it will be understood by those skilled in the art that various changes in forms and details may be made therein without departing from the spirit and scope of the disclosure as defined by the following claims.

The invention claimed is:

1. An X-ray Computed Tomography (CT) system for generating CT images for objects to be imaged comprising:
    an X-ray source for generating an X-ray beam;
    an X-ray detector subsystem for receiving and converting X-ray photons from said X-ray beam to digital data;
    a rotor for mounting and aligning said X-ray detector subsystem and said X-ray source;
    a ring structure comprising a stator connected with said rotor via an axial bearing, so as to rotate said rotor within the axial plane;
    a hanging support connected with said ring structure via two sagittal driving bearings, so as to tilt said ring structure within the sagittal plane; and,
    a ceiling mounted rail connected with said hanging support, so as to move said X-ray source and said X-ray detector subsystem together along said ceiling rail for acquiring said digital data representing the X-ray attenuation coefficients of said objects to be imaged.

2. The system of claim 1, wherein the weight of said X-ray CT system excluding said ceiling mounted rail is no more than 500 kilograms.

3. The system of claim 1, wherein at least one battery unit is included to be mounted on said rotor to provide power to said rotor.

4. The system of claim 3, wherein one or more of said battery units are charged with single phase power.

5. The system of claim 4, wherein the charging of one or more of said battery units is performed while said rotor is not rotating.

6. The system of claim 1, wherein said hanging support extends and retracts for moving said ring structure along the Y axis.

7. The system of claim 1, wherein said ring structure is at a tilted position with respect to the X axis while said objects are being imaged.

8. The system of claim 1, wherein said hanging support together with said ring structure is yawed about the Y axis.

9. The system of claim 1, wherein said X-ray source does not include a high voltage generation unit, thus a separate high voltage power generator is also included to be directly mounted on said rotor, providing high voltage power to said X-ray source.

10. The system of claim 9, wherein said high voltage generator uses DC power as an input.

11. The system of claim 1, wherein an image reconstructor is also included to be mounted on said rotor for generating images of said scanned objects using said acquired digital data.

12. The system of claim 1, wherein said CT system is installed in surgical operating rooms, and said objects to be imaged comprise a patient placed on a surgical operating table while being surgically operated.

13. The system of claim 12, wherein said ceiling mounted rail is installed and connected across multiple surgical operating rooms, such that said CT system is moved along said ceiling mounted rail from one surgical operating room to another surgical operating room.

14. The system of claim 13, wherein said movement of said CT system along said ceiling mounted rail is manually pushed or pulled.

15. The system of claim 13, wherein said movement of said CT system along said ceiling mounted rail is electrically powered and controlled.

16. The system of claim 1, wherein the thickness of said ring structure is no more than 40 cm.

17. The system of claim 1, wherein the width of said ring structure is no more than 40 cm.

18. The system of claim 1, wherein the diameter of the opening of said ring structure for scanning objects is no smaller than 110 cm.

* * * * *